E. G. LAVOIE.
ROBE HOLDER.
APPLICATION FILED MAR. 24, 1919.
1,383,730.
Patented July 5, 1921.
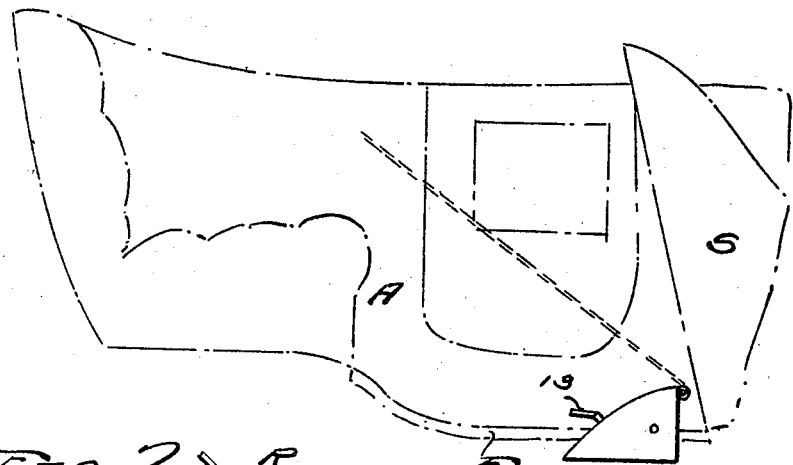
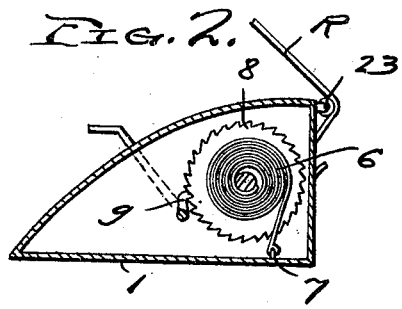
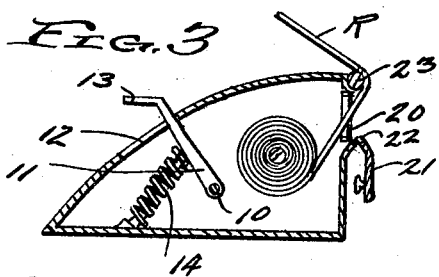
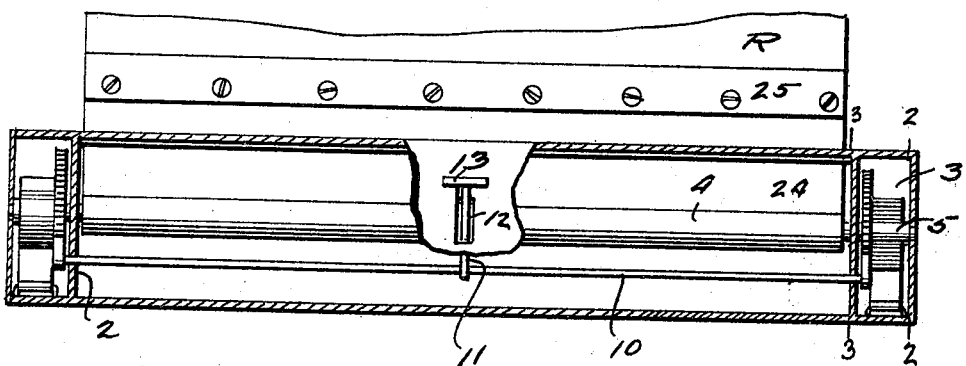
WITNESSES
INVENTOR.
Emery G. Lavoie
BY
ATTORNEY.

UNITED STATES PATENT OFFICE.

EMERY G. LAVOIE, OF GREENWICH, CONNECTICUT.

ROBE-HOLDER.

1,383,730.  Specification of Letters Patent.  Patented July 5, 1921.

Application filed March 24, 1919. Serial No. 284,600.

*To all whom it may concern:*

Be it known that I, EMERY G. LAVOIE, a citizen of the United States, residing at Greenwich, in the county of Fairfield and State of Connecticut, have invented certain new and useful Improvements in Robe-Holders, of which the following is a specification.

This invention relates to automobile robes, and more especially to the devices for protecting and storing them when not in use; and the object of the same is to provide a container having a drum on which the automobile robe is wound by spring power and from which it is unwound by hand. A further object is to so shape and locate the device that it becomes a foot rest.

Another object is to provide means for housing the robe in a practically dust proof container when it is not in use, as for instance in the summer time.

Details are set forth below and are shown in the drawings, wherein—

Figure 1 is a diagrammatic sectional view of a portion of an automobile body, showing this device as set into the floor thereof.

Fig. 2 is an enlarged cross section of the device itself and Fig. 3 another section showing a slight modification, said sections being taken respectively on the lines 2—2 and 3—3 of Fig. 4.

Fig. 4 is a longitudinal section through the device.

We are concerned only with the automobile body A, its floor F and its front seats. Into the floor at about the position shown in Fig. 1 with respect to the front seat, I inset or build the body or casing 1, which contains the drum and eventually the robe R. This casing has transverse partitions 2 near both ends, the partitions producing compartments 3 in which are stored the power springs for causing the normal winding of a roller or drum 4 which extends throughout the length of the casing and has trunnions 5 journaled in the partitions. As herein shown, each trunnion 5 is surrounded by a spring 6 fastened at its inner end to the trunnion and at its outer end at the point 7 to the casing. Each trunnion also carries a ratchet wheel 8 engaged by a pawl 9 mounted at one end of a shaft 10 which may extend throughout the full length of the casing, and on this shaft at an appropriate point is fixed a pedal 11 projecting through a slot in the casing as shown at 12 and having a foot piece 13 standing just above the floor F as seen in Fig. 1. A spring 14 within the casing normally raises the pedal and holds the pawls 9 in engagement with the teeth of the ratchet wheels to prevent the rotation of the latter, but when the pedal is depressed the pawls will disengage the ratchets and the springs may wind the drum.

As herein shown, the forward side of the casing, by which I mean that side which is disposed near a passenger sitting on the rear seat, is curved so that it presents a very good foot rest; the bottom of the casing is flat and the front is flat; and in the front wall at an appropriate point I provide a slot 20 through which the robe R may pass. In Fig. 3 I have shown a door 21 hinged at 22 and adapted when turned on its hinge to close the slot so that the casing will be almost dust proof.

As the slot 20 is in the far or rear wall of the casing, dirt off the feet of passengers will not fall thereinto. Alongside the slot is preferably mounted a small roller 23 over which the robe passes before it is carried inward through the slot 20 and is connected to the roller or drum 4. For such connection I preferably employ a sheet of canvas 24 or the like fastened at one end to the roller 4 as seen in Fig. 4 and detachable means as indicated at 25 for connecting the outer end of the canvas with the robe R. Such means is only theoretically illustrated and forms no part of the present invention.

In use with the casing mounted in the floor as indicated in Fig. 1, it is quite obvious that the front of said casing serves as a good foot rest. When it is desired to use the robe, the operator reaches over the casing and between it and the front seat S and grasps the edge of the robe which normally protrudes slightly, and draws it up over his lap. In doing so he winds on the drum and stores power in the two springs. When it is not desired to use the robe, he has but to step on the foot-piece 23 and let out on the robe, and the latter passes down over the roller 13 and automatically winds upon the drum as the springs expand. Should he release the robe and at the same time depress the pedal, the robe will pass completely into the slot 20, after which the door 21 can be closed as shown in Fig. 3.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent is:—

In a device of the class described, a casing having a slot in one wall, a drum having trunnions at its ends journaled in said casing, the body of the drum adapted for engagement of a robe passing through said slot; a spring on each trunnion for normally imparting movement to the drum, a ratchet wheel fast upon each trunnion, a pawl engaging each ratchet wheel, a shaft connecting the two pawls, and a pedal secured to said shaft and projecting through the casing for operating said shaft at will.

In testimony whereof I affix my signature in presence of two witnesses.

EMERY G. LAVOIE.

Witnesses:
 W. STANLEY FINNEY,
 B. FRANK FINNEY.